US012654662B2

(12) United States Patent
Kim et al.

(10) Patent No.: US 12,654,662 B2
(45) Date of Patent: Jun. 16, 2026

(54) APPARATUS FOR CONTROLLING ELECTRO-MECHANICAL BRAKING SYSTEM AND METHOD THEREOF

(71) Applicant: HYUNDAI MOBIS CO., LTD., Seoul (KR)

(72) Inventors: Se Hyun Kim, Yongin-si (KR); Bo Min Kim, Yongin-si (KR); Byeong Jin Choi, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 51 days.

(21) Appl. No.: 18/768,600

(22) Filed: Jul. 10, 2024

(65) Prior Publication Data

US 2025/0058747 A1     Feb. 20, 2025

(30) Foreign Application Priority Data

Aug. 16, 2023     (KR) ........................ 10-2023-0106900

(51) Int. Cl.
*B60T 8/17*         (2006.01)
*B60T 8/171*        (2006.01)
         (Continued)

(52) U.S. Cl.
CPC .............. *B60T 8/172* (2013.01); *B60T 8/171* (2013.01); *B60T 13/745* (2013.01);
         (Continued)

(58) Field of Classification Search
CPC .......... B60T 8/171; B60T 8/172; B60T 8/885; B60T 13/662; B60T 13/741; B60T 13/745; B60T 17/22; B60T 2220/04; B60T 2270/415; B60T 2270/402; B60T 2270/413; B60T 7/085; B60T 7/12
         (Continued)

(56) References Cited

U.S. PATENT DOCUMENTS 9,346,445 B2 *  5/2016  Anderson ............. B60T 13/145
12,409,819 B2 *  9/2025  Lee ......................... B60T 8/329
         (Continued)

FOREIGN PATENT DOCUMENTS

KR          10-1417863 B1       7/2014

*Primary Examiner* — Hai H Huynh
*Assistant Examiner* — Johnny H Hoang
(74) *Attorney, Agent, or Firm* — Morgan, Lewis & Bockius LLP

(57)          ABSTRACT

An apparatus for controlling an electro-mechanical braking system includes a first braking control module configured to receive at least one of an electronic parking brake (EPB) switch signal, a braking control signal, or a cylinder pressure value and to operate a parking brake and an additional braking valve; a second braking control module configured to receive at least one of a brake pedal signal, the braking control signal, or the cylinder pressure value and to operate a braking motor and a main braking valve, a first power module configured to supply power to the first braking control module, a second power module configured to supply power to the second braking control module, an integrated switch configured to integrate output powers of the first power module and the second power module, and a connection bus configured to transfer transmission and reception signals, and a method thereof.

19 Claims, 2 Drawing Sheets

(51) Int. Cl.
    *B60T 8/172*         (2006.01)
    *B60T 13/74*         (2006.01)

(52) U.S. Cl.
    CPC ..... *B60T 2220/04* (2013.01); *B60T 2270/402*
                (2013.01); *B60T 2270/415* (2013.01)

(58) Field of Classification Search
    USPC ...................................................... 701/70–81
    See application file for complete search history.

(56)                References Cited

U.S. PATENT DOCUMENTS

| | | | |
|---|---|---|---|
| 2018/0290640 A1* | 10/2018 | Johnson | B60T 13/662 |
| 2021/0078556 A1* | 3/2021 | Laine | B60T 13/683 |
| 2022/0289156 A1* | 9/2022 | Lee | B60T 8/94 |
| 2022/0289162 A1* | 9/2022 | Lee | B60T 8/17616 |

\* cited by examiner

APPARATUS FOR CONTROLLING ELECTRO-MECHANICAL BRAKING SYSTEM AND METHOD THEREOF

CROSS-REFERENCE TO RELATED APPLICATION

This application claims priority from and the benefit of Korean Patent Application No. 10-2023-0106900, filed on Aug. 16, 2023, which is hereby incorporated by reference for all purposes as if set forth herein.

BACKGROUND

Field

Exemplary embodiments of the present disclosure relate to an apparatus for controlling an electro-mechanical braking system and a method thereof and, more particularly, to an apparatus for controlling an electro-mechanical braking system formed such that an additional braking module for additional braking including a parking brake and a main braking module for main braking of a vehicle are independently configured to secure braking performance through linked control even when a failure occurs, and a method thereof.

Discussion of the Background

Braking systems are essential for vehicles. This is because a vehicle that cannot stop cannot travel. Therefore, the stability of braking systems cannot be overemphasized for the safety of passengers.

Therefore, instead of the existing hydraulic system, an electronic master booster is used to boost and provide a braking hydraulic pressure. An anti-lock braking system (ABS) for preventing tires from locking during sudden braking and shortening a the braking distance by avoiding sudden steering wheel manipulation to avoid danger, an electronic stability control (ESC) system for stably maintaining a vehicle attitude by adjusting a braking force of a vehicle and an engine output in a hazard situation in which the vehicle is slipping, and an electronic parking brake (EPB) which automatically locks the brake when the vehicle stops or starts up a hill to prevent the vehicle from rolling backwards and automatically releases when the vehicle starts are employed.

Recently, as interest in autonomous vehicles and electric vehicles increases, braking systems also require stronger braking power and stability, and these electronically controlled braking devices are being applied in combination.

SUMMARY

As described above, in order to implement an electro-mechanical braking system by combining electronically controlled braking devices, there is a problem of requiring numerous wirings to operate each device.

In addition, in order to mount each electronically controlled braking device, a mounting position for each device is required so that there is a problem of securing a space in a vehicle.

Meanwhile, when a failure occurs while the vehicle is traveling and thus the electronically controlled braking system is inoperable, it can lead to a serious accident so that it is necessary to prepare for the electronically controlled braking system being inoperable.

Various embodiments, which are made to address the above-mentioned problem, are directed to an apparatus for controlling an electro-mechanical braking system formed such that an additional braking module for additional braking including a parking brake and a main braking module for main braking of a vehicle are independently configured to secure braking performance through linked control even when a failure occurs, and a method thereof.

According to an aspect of the present disclosure, there is provided an apparatus for controlling an electro-mechanical braking system, which includes a first braking control module configured to receive at least one of an electronic parking brake (EPB) switch signal, a braking control signal, or a cylinder pressure value and operate a parking brake and an additional braking valve; a second braking control module configured to receive at least one of a brake pedal signal, the braking control signal, or the cylinder pressure value and operate a braking motor and a main braking valve; a first power module configured to supply power to the first braking control module; a second power module configured to supply power to the second braking control module; an integrated switch switched under control of the first braking control module or the second braking control module and configured to integrate output powers of the first power module and the second power module; and a connection bus configured to transfer transmission and reception signals between the first braking control module and the second braking control module.

When an open-circuit failure occurs in any one of the first power module and the second power module, the first braking control module and the second braking control module may operate the integrated switch to integrate the output powers.

When a short-circuit failure occurs in any one of the first power module and the second power module, the first braking control module and the second braking control module may turn the integrated switch off to separate the output powers.

The first braking control module may include an EPB signal input module configured to receive the EPB switch signal; a first communication module configured to communicate with a peripheral control device through in-vehicle communication and configured to receive the braking control signal; an EPB driving module configured to operate a parking brake; an additional braking valve driving module configured to drive the additional braking valve for additional braking; a first cylinder pressure input module configured to receive the cylinder pressure value from a cylinder pressure sensor; and a first processor operatively coupled to the EPB signal input module, the first communication module, the EPB driving module, the additional braking valve driving module, and the first cylinder pressure input module, wherein the first processor may control the EPB driving module and the additional braking valve driving module according to signals input from at least one of the EPB signal input module, the first communication module, or the first cylinder pressure input module.

The first communication module may include a common channel shared with the second braking control module.

The first processor may receive a failure signal and, when the failure signal corresponds to an open-circuit failure that occurs in the second power module, the first processor may operate the integrated switch and, when the failure signal corresponds to a short-circuit failure that occurs in the second power module, the first processor may turn the integrated switch off.

The second braking control module may include a pedal signal input module configured to receive a pedal stroke value from a brake pedal sensor; a second communication module configured to communicate with a peripheral control device through in-vehicle communication and configured to receive the braking control signal; a motor driving module configured to drive the braking motor; a main braking valve driving module configured to drive the main braking valve for main braking of a vehicle; a second cylinder pressure input module configured to receive the cylinder pressure value from a cylinder pressure sensor; and a second processor operatively coupled to the pedal signal input module, the second communication module, the motor driving module, the main braking valve driving module, and the second cylinder pressure input module, wherein the second processor may control the motor driving module and the main braking valve driving module according to signals input from at least one of the pedal signal input module, the second communication module, or the second cylinder pressure input module.

The second communication module may include a common channel shared with the first braking control module.

The second processor may receive a failure signal and, when the failure signal corresponds to an open-circuit failure that occurs in the first power module, the second processor may operate the integrated switch and, when the failure signal corresponds to a short-circuit failure that occurs in the first power module, the second processor may turn the integrated switch off.

According to another aspect of the present disclosure, there is provided a method of controlling an electro-mechanical braking system including a first braking control module, a second braking control module, a first power module configured to supply power to the first braking control module, a second power module configured to supply power to the second braking control module, and an integrated switch. The method includes receiving, by the first braking control module, an electronic parking brake (EPB) switch signal, a braking control signal, and a cylinder pressure value, and receiving, by the second braking control module, a brake pedal signal, the braking control signal, and the cylinder pressure value; driving, by the first braking control module, a parking brake and an additional braking valve according to an input signal, and driving, by the second braking control module, a braking motor and a main braking valve according to an input signal; receiving, by the first braking control module and the second braking control module, a failure signal; when the failure signal corresponds to an open-circuit failure that occurs in any one of the first power module and the second power module, operating the integrated switch to integrate output powers of the first power module and the second power module; and when the failure signal corresponds to a short-circuit failure that occurs in any one of the first power module and the second power module, turning the integrated switch off to separate the output powers.

DETAILED DESCRIPTION OF THE ILLUSTRATED EMBODIMENTS

Figure 1:
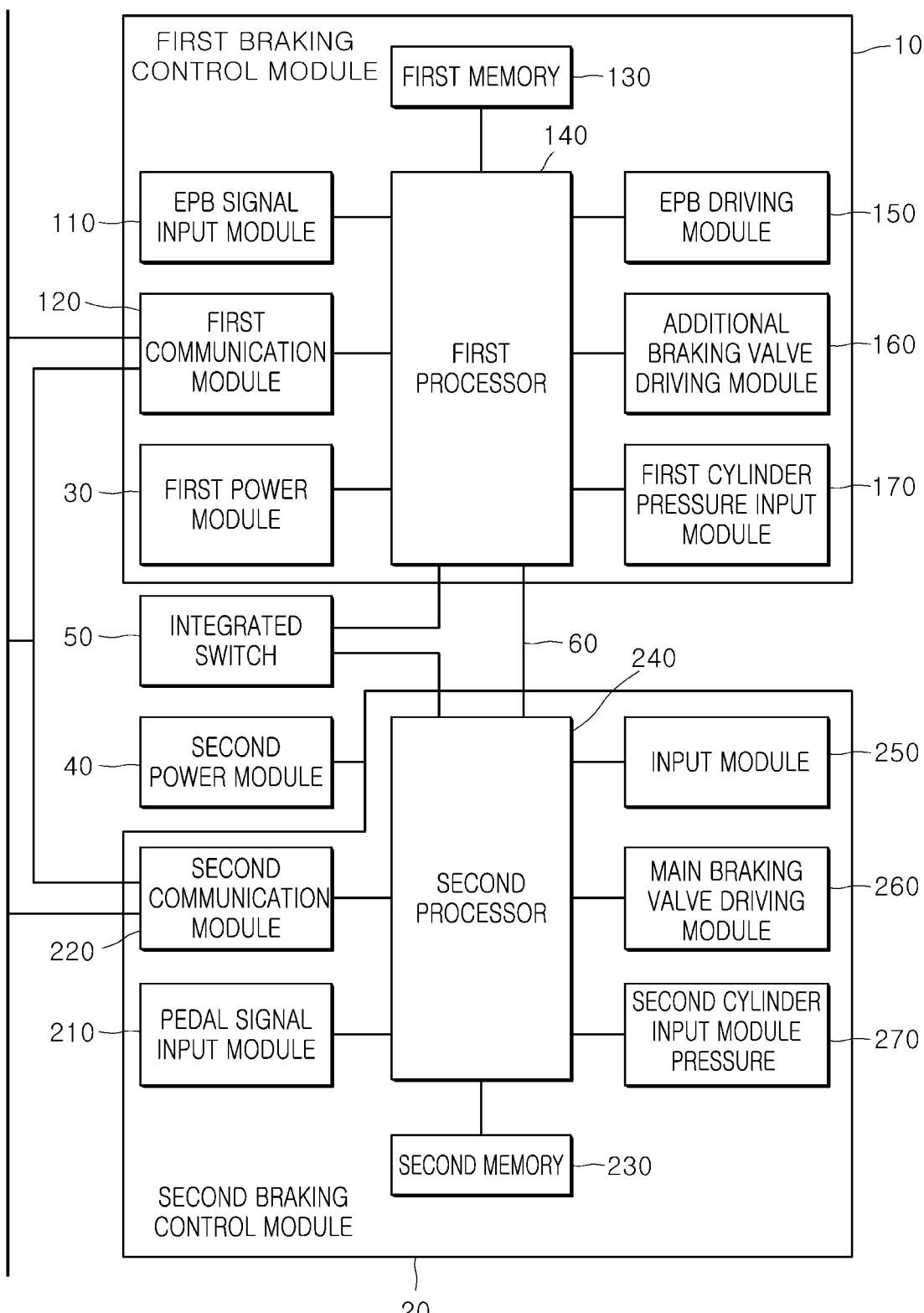
FIG. 1 is a block diagram illustrating an apparatus for controlling an electro-mechanical braking system according to one embodiment of the present disclosure.

Hereinafter, an apparatus for controlling an electro-mechanical braking system and a method thereof according to the present disclosure will be described with reference to the accompanying drawings. Here, thicknesses of lines, sizes of constituent elements, or the like illustrated in the drawings, may be exaggerated for clarity and convenience of description. In addition, the terms described below are defined in consideration of the functions of the present disclosure, and these terms may be varied according to the intent or custom of a user or an operator. Therefore, the definitions of the terms used herein should follow contexts disclosed herein.

FIG. 1 is a block diagram illustrating an apparatus for controlling an electro-mechanical braking system according to one embodiment of the present disclosure.

As shown in FIG. 1, the apparatus for controlling an electro-mechanical braking system according to one embodiment of the present disclosure may include a first braking control module 10, a second braking control module 20, a first power module 30, a second power module 40, an integrated switch 50, and a connection bus 60.

The first braking control module 10 may receive at least one of an electronic parking brake (EPB) switch signal, a braking control signal, or a cylinder pressure value to drive a parking brake and an additional braking valve.

Here, the additional braking valve may include an inlet valve and an outlet valve for controlling a hydraulic pressure supplied to a wheel cylinder for driving an anti-lock braking system (ABS) and an electronic stability control (ESC).

The second braking control module 20 may receive at least one of a brake pedal signal, the braking control signal, or the cylinder pressure value to drive a braking motor and a main braking valve.

The first power module 30 may independently supply power to the first braking control module 10.

The second power module 40 may independently supply power to the second braking control module 20.

The integrated switch 50 may be switched under the control of the first braking control module 10 or the second braking control module 20 to integrate output powers of the first power module 30 and the second power module 40.

Here, the integrated switch 50 may supply output power of the first power module 30 to the second braking control module 20 and supply output power of the second power module 40 to the first braking control module 10.

Therefore, the first braking control module 10 and the second braking control module 20 may receive a failure signal and, when an open-circuit failure occurs in any one of the first power module 30 and the second power module 40, the first braking control module 10 and the second braking control module 20 may operate the integrated switch 50 to integrate the output powers. However, when a short-circuit failure occurs in any one of the first power module 30 and the second power module 40, the first braking control module 10 and the second braking control module 20 may turn the integrated switch 50 off to separate the output powers.

In this way, when the open-circuit failure occurs in the first power module 30 and the second power module 40, the output powers may be integrated through the integrated switch 50 so that the first braking control module 10 and the second braking control module 20 may operate normally.

The connection bus 60 may transfer transmission and reception signals between the first braking control module 10 and the second braking control module 20.

For example, the connection bus 60 may transfer the transmission and reception signals between the first braking control module 10 and the second braking control module 20 through a general purpose input output (GPIO) or a universal asynchronous receiver transmitter (UART).

In this way, the first braking control module 10 for additional braking including the parking brake and the second braking control module 20 for the main braking of the vehicle may be separated and may independently receive power through the first power module 30 and the second power module 40. When an open-circuit failure occurs in any one of the first power module 30 and the second power module 40, the integrated switch 50 is operated to integrate the output powers so that both the first braking control module 10 and the second braking control module 20 may operate normally.

In addition, when a short-circuit failure occurs in any one of the first power module 30 and the second power module 40, the integrated switch 50 is turned off to separate the powers, and braking performance may be secured through a complementary redundancy method by the first braking control module 10 or the second braking control module 20, which operates normally according to the braking control signal.

Meanwhile, even when a failure occurs in the first braking control module 10 or the second braking control module 20, braking performance may be secured through the complementary redundancy method by the first braking control module 10 or the second braking control module 20, which operates normally according to the braking control signal from a peripheral control device.

More specifically, the first braking control module 10 may include an EPB signal input module 110, a first communication module 120, an EPB driving module 150, an additional braking valve driving module 160, a first memory 130, and a first processor 140.

The EPB signal input module 110 may receive an EPB switch signal.

In this case, the EPB switch signal may be directly received through the EPB signal input module 110 or may be received from a peripheral control device through in-vehicle communication by the first communication module 120.

The first communication module 120 may communicate with the peripheral control device through the in-vehicle communication and receive a braking control signal.

In addition, the first communication module 120 may include a common channel shared with the second braking control module 20 to receive the same signal.

Here, the braking control signal may include not only a control signal for additional braking from the peripheral control device, but also a control signal for exhibiting braking performance through a redundancy function when a failure occurs in the second braking control module 20.

The EPB driving module 150 may operate the parking brake using power of a motor.

The additional braking valve driving module 160 may drive an additional braking valve which includes an inlet valve and an outlet valve for controlling a hydraulic pressure supplied to a wheel cylinder for additional braking according to an ABS or ESC function.

The first cylinder pressure input module 170 may receive a master cylinder pressure value and a backup cylinder pressure value from a cylinder pressure sensor.

The first memory 130 may store an executable program and related data for braking control, and the stored information may be selected by the first processor 140, as necessary.

That is, the first memory 130 stores various types of data and commands generated during the execution of an operating system (O/S) or application (program or applet) for the braking control.

In this case, the first memory 130 may be implemented as a non-volatile memory, a volatile memory, a flash-memory, a hard disk drive (HDD), or a solid state drive (SSD). In addition, the first memory 130 may be accessed, and reading/recording/editing/deleting/updating of data may be performed by the first processor 140.

The first processor 140 may be operatively coupled to the EPB signal input module 110, the first communication module 120, the EPB driving module 150, the additional braking valve driving module 160, and the first cylinder pressure input module 170 and may perform various operations so as to control the overall operation for the braking control by copying various programs stored in the first memory 130 to a RAM and executing the various programs.

Here, although the first processor 140 is described as including only one central processing unit (CPU), the first processor 140 may be implemented as a plurality of CPUs (or digital signal processors (DSPs), system-on-chips (SoCs), or the like).

That is, the first processor 140 may control the EPB driving module 150 and the additional braking valve driving module 160 according to signals input from at least one of the EPB signal input module 110, the first communication module 120, or the first cylinder pressure input module 170.

Therefore, the first processor 140 receives a failure signal and, when an open-circuit failure occurs in the second power module 40, the first processor 140 may operate the integrated switch 50 to integrate the output powers, and when a short-circuit failure occurs in the second power module 40, the first processor 140 may turn the integrated switch 50 off to separate the output powers.

Next, the second braking control module 20 may include a pedal signal input module 210, a second communication module 220, a motor driving module 250, a main braking valve driving module 260, a second cylinder pressure input module 270, a second memory 230, and a second processor 240.

The pedal signal input module 210 may receive a pedal stroke value from a brake pedal sensor.

In this case, the pedal stroke value may be directly input through the pedal signal input module 210 or may be input from a peripheral control device through the in-vehicle communication by the second communication module 220.

The second communication module 220 may communicate with the peripheral control device through the in-vehicle communication and receive a braking control signal.

In addition, the second communication module 220 may include a common channel shared with the first braking control module 10 to receive the same signal.

Here, the braking control signal may include not only a control signal for additional braking from the peripheral control device, but also a control signal for exhibiting braking performance through a redundancy function when a failure occurs in the first braking control module 10.

The motor driving module 250 may drive a braking motor of an electric booster for main braking of the vehicle.

The main braking valve driving module 260 may drive a main braking valve for controlling a hydraulic pressure of a master cylinder for the main braking of the vehicle according to an operation of a brake pedal.

The second cylinder pressure input module 270 may receive a master cylinder pressure value and a backup cylinder pressure value from the cylinder pressure sensor.

The second memory 230 may store an executable program and related data for braking control, and the stored information may be selected by the second processor 240, as necessary.

That is, the second memory 230 stores various types of data and commands generated during the execution of an O/S or application (program or applet) for the braking control.

In this case, the second memory 230 may be implemented as a non-volatile memory, a volatile memory, a flash-memory, an HDD, or an SSD. In addition, the second memory 230 is accessed, and reading/recording/editing/deleting/updating of data may be performed by the second processor 240.

The second processor 240 may be operatively coupled to the pedal signal input module 210, the second communication module 220, the motor driving module 250, the main braking valve driving module 260, and the second cylinder pressure input module 270 and may perform various operations so as to control the overall operation for the braking control by copying various programs stored in the second memory 230 to a RAM and executing the various programs.

Here, although the second processor 240 is described as including only one CPU, the second processor 240 may be implemented as a plurality of CPUs (or DSPs, SoCs, or the like).

That is, the second processor 240 may control the motor driving module 250 and the main braking valve driving module 260 according to signals input from at least one of the pedal signal input module 210, the second communication module 220, or the second cylinder pressure input module 270.

Therefore, the second processor 240 receives a failure signal and, when an open-circuit failure occurs in the first power module 30, the second processor 240 may operate the integrated switch 50 to integrate the output powers, and when a short-circuit failure occurs in the first power module 30, the second processor 240 may turn the integrated switch 50 off to separate the output powers.

As described above, according to the apparatus for controlling an electro-mechanical braking system according to one embodiment of the present disclosure, the apparatus for controlling an electro-mechanical braking system is independently formed by dividing into an additional braking module for additional braking including the parking brake and a main braking module for main braking of the vehicle. Even when a failure occurs, braking performance can be secured through a redundancy method of one control device through linked control, and thus not only safety can be improved, but the number of parts can be reduced by reducing the number of controllers to achieve miniaturization and weight reduction so that an increase in productivity can be expected.

Figure 2:
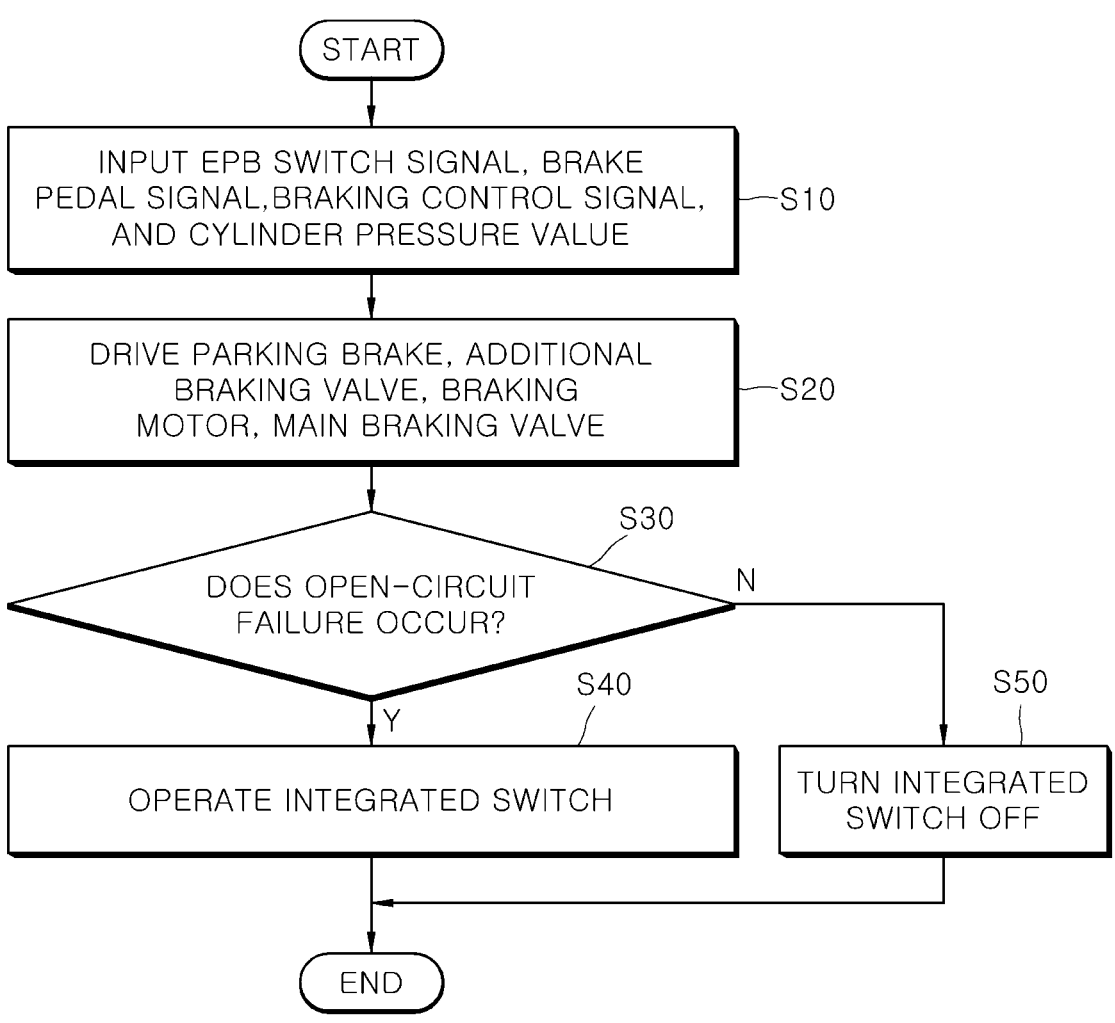
FIG. 2 is a flowchart for describing a method of controlling an electro-mechanical braking system according to one embodiment of the present disclosure.

FIG. 2 is a flowchart for describing a method of controlling an electro-mechanical braking system according to one embodiment of the present disclosure.

As shown in FIG. 2, according to the method of controlling an electro-mechanical braking system according to one embodiment of the present disclosure, the first braking control module 10 first receives an EPB switch signal, a braking control signal, and a cylinder pressure value, and the second braking control module 20 receives a brake pedal signal, the braking control signal, and the cylinder pressure value (S10).

In operation S10, the first braking control module and the second braking control module receive the EPB switch signal, the brake pedal signal, and the cylinder pressure values for braking control, and then the first braking control module drives the parking brake and the additional braking valve according to the input signals and the braking control signal, and the second braking control module drives the braking motor and the main braking valve (S20).

Here, the additional braking valve may include an inlet valve and an outlet valve for controlling a hydraulic pressure supplied to a wheel cylinder for driving an ABS and an ESC.

In such a steady state, the first braking control module 10 and the second braking control module 20 receive a failure signal while independently performing the braking control and determine whether an open-circuit failure occurs in the power modules (S30).

In operation S30, whether the open-circuit failure occurs is determined, and when the open-circuit failure occurs, that is, when the first braking control module 10 and the second braking control module 20 receive the failure signal, and the open-circuit failure occurs in any one of the first power module 30 and the second power module 40, the integrated switch 50 is operated to integrate output powers (S40).

In this way, when the open-circuit failure occurs in the power module, the integrated switch 50 is operated to integrate the output powers of the first power module 30 and the second power module 40 so that both the first braking control module 10 and the second braking control module 20 operate normally.

Otherwise, in operation S30, whether the open-circuit failure occurs in the power module is determined, and when a short-circuit failure rather than the open-circuit failure occurs, that is, when the short-circuit failure occurs in any one of the first power module 30 and the second power module 40, the first braking control module 10 and the second braking control module 20 turn the integrated switch 50 off to separate the output powers (S50).

As described above, when the power is not supplied due to the short-circuit failure of the power module, braking performance may be secured through the complementary redundancy method by the first braking control module 10 or the second braking control module 20, which operates normally according to the braking control signal.

In addition, even when a failure occurs in the first braking control module 10 or the second braking control module 20, braking performance may be secured through the complementary redundancy method by the first braking control module 10 or the second braking control module 20, which operates normally according to the braking control signal from a peripheral control device.

As described above, according to the method of controlling an electro-mechanical braking system according to one embodiment of the present disclosure, the apparatus for controlling an electro-mechanical braking system is independently formed by dividing into an additional braking module for additional braking including the parking brake and a main braking module for main braking of the vehicle. Even when a failure occurs, braking performance can be secured through a redundancy method of one control device through linked control, and thus not only safety can be improved, but the number of parts can be reduced by reducing the number of controllers to achieve miniaturization and weight reduction so that an increase in productivity can be expected.

Implementations described herein may also be implemented by, for example, a method or process, an apparatus, a software program, a data stream, or a signal. Even when only discussed in the context in a single form of implementation (e.g., discussed only as a method), the implementation of features discussed may also be implemented in other forms (e.g., an apparatus or program). The apparatus may be implemented in suitable hardware, software, and firmware. The method may be implemented in an apparatus such as a processor, which is generally referred to as a processing device including, for example, a computer, a microprocessor, an integrated circuit, or a programmable logic device. The processor also includes communication devices such as computers, cellular phones, portable/personal digital assistants ("PDAs"), and other devices that facilitate information communication between end-users.

In accordance with an apparatus for controlling an electro-mechanical braking system and a method thereof according to an aspect of the present disclosure, the apparatus for controlling an electro-mechanical braking system is independently formed by dividing into an additional braking module for additional braking including the parking brake and a main braking module for main braking of the vehicle. Even when a failure occurs, braking performance can be secured through a redundancy method of one control device through linked control, and thus not only safety can be improved, but the number of parts can be reduced by reducing the number of controllers to achieve miniaturization and weight reduction so that an increase in productivity can be expected.

While the present disclosure has been described with reference to the embodiments shown in the drawings, these embodiments are merely illustrative and it should be understood that various modifications and equivalent other embodiments can be derived by those skilled in the art on the basis of the embodiments.

Therefore, the true technical scope of the present disclosure should be defined by the appended claims.

What is claimed is:

1. An apparatus for controlling an electro-mechanical braking system, the apparatus comprising:
   a first braking control module configured to receive at least one of an electronic parking brake (EPB) switch signal, a braking control signal, or a cylinder pressure value and to operate a parking brake and an additional braking valve;
   a second braking control module configured to receive at least one of a brake pedal signal, the braking control signal, or the cylinder pressure value and to operate a braking motor and a main braking valve;
   a first power module configured to supply power to the first braking control module;
   a second power module configured to supply power to the second braking control module;
   an integrated switch switched under control of the first braking control module or the second braking control module and configured to integrate output powers of the first power module and the second power module; and
   a connection bus configured to transfer transmission and reception signals between the first braking control module and the second braking control module,
   wherein the first braking control module and the second braking control module are separated and independently receive power through the first power module and the second power module, respectively,
   wherein, when the integrated switch is on, the integrated switch is configured to supply output power of the first power module to the second braking control module and to supply output power of the second power module to the first braking control module,
   wherein, when the integrated switch is off, the first power module does not supply power to the second braking control module, and the second power module does not supply power to the first braking control module.

2. The apparatus of claim 1, wherein, when an open-circuit failure occurs in any one of the first power module and the second power module, the first braking control module and the second braking control module turn the integrated switch on to integrate the output powers.

3. The apparatus of claim 1, wherein, when a short-circuit failure occurs in any one of the first power module and the second power module, the first braking control module and the second braking control module turn the integrated switch off to separate the output powers.

4. The apparatus of claim 1, wherein the first braking control module includes:
   an EPB signal input module configured to receive the EPB switch signal;
   a first communication module configured to communicate with a peripheral control device through in-vehicle communication and configured to receive the braking control signal;
   an EPB driving module configured to operate a parking brake;
   an additional braking valve driving module configured to drive the additional braking valve for additional braking;
   a first cylinder pressure input module configured to receive the cylinder pressure value from a cylinder pressure sensor; and
   a first processor operatively coupled to the EPB signal input module, the first communication module, the EPB driving module, the additional braking valve driving module, and the first cylinder pressure input module,
   wherein the first processor controls the EPB driving module and the additional braking valve driving module according to signals input from at least one of the EPB signal input module, the first communication module, or the first cylinder pressure input module.

5. The apparatus of claim 4, wherein the first communication module includes a common channel shared with the second braking control module.

6. The apparatus of claim 4, wherein:
   when a failure signal received by the first processor corresponds to an open-circuit failure that occurs in the second power module, the first processor turns the integrated switch on, and
   when the failure signal corresponds to a short-circuit failure that occurs in the second power module, the first processor turns the integrated switch off.

7. The apparatus of claim 1, wherein the second braking control module includes:
   a pedal signal input module configured to receive a pedal stroke value from a brake pedal sensor;
   a second communication module configured to communicate with a peripheral control device through in-vehicle communication and configured to receive the braking control signal;
   a motor driving module configured to drive the braking motor;
   a main braking valve driving module configured to drive the main braking valve for main braking of a vehicle;
   a second cylinder pressure input module configured to receive the cylinder pressure value from a cylinder pressure sensor; and
   a second processor operatively coupled to the pedal signal input module, the second communication module, the motor driving module, the main braking valve driving module, and the second cylinder pressure input module, wherein the second processor controls the motor driving module and the main braking valve driving module according to signals input from at least one of the pedal signal input module, the second communication module, or the second cylinder pressure input module.

8. The apparatus of claim 7, wherein the second communication module includes a common channel shared with the first braking control module.

9. The apparatus of claim 7, wherein;
when a failure signal received by the second processor corresponds to an open-circuit failure that occurs in the first power module, the second processor turns the integrated switch on, and
when the failure signal corresponds to a short-circuit failure that occurs in the first power module, the second processor turns the integrated switch off.

10. A method of controlling an electro-mechanical braking system comprising a first braking control module, a second braking control module, a first power module configured to supply power to the first braking control module, a second power module configured to supply power to the second braking control module, and an integrated switch, the method comprising:
receiving, by the first braking control module, an electronic parking brake (EPB) switch signal, a braking control signal, and a cylinder pressure value, and receiving, by the second braking control module, a brake pedal signal, the braking control signal, and the cylinder pressure value;
driving, by the first braking control module, a parking brake and an additional braking valve according to an input signal, and driving, by the second braking control module, a braking motor and a main braking valve according to an input signal;
receiving, by the first brake control module and the second braking control module, a failure signal;
when the failure signal corresponds to an open-circuit failure that occurs in any one of the first power module and the second power module, turning the integrated switch on to integrate output powers of the first power module and the second power module; and
when the failure signal corresponds to a short-circuit failure that occurs in any one of the first power module and the second power module, turning the integrated switch off to separate the output powers.

11. An apparatus for controlling an electro-mechanical braking system, the apparatus comprising:
a first braking control module configured to receive at least one of an electronic parking brake (EPB) switch signal, a braking control signal, or a cylinder pressure value and to operate a parking brake and an additional braking valve;
a second braking control module configured to receive at least one of a brake pedal signal, the braking control signal, or the cylinder pressure value and to operate a braking motor and a main braking valve;
a first power module configured to supply power to the first braking control module;
a second power module configured to supply power to the second braking control module;
an integrated switch switched under control of the first braking control module or the second braking control module and configured to integrate output powers of the first power module and the second power module; and a connection bus configured to transfer transmission and reception signals between the first braking control module and the second braking control module,
wherein the first braking control module and the second braking control module are configured to selectively turn the integrated switch on or off depending on a type of failure detected in either the first power module or the second power module.

12. The apparatus of claim 11, wherein, when an open-circuit failure occurs in any one of the first power module and the second power module, the first braking control module and the second braking control module turn the integrated switch on to integrate the output powers.

13. The apparatus of claim 11, wherein, when a short-circuit failure occurs in any one of the first power module and the second power module, the first braking control module and the second braking control module turn the integrated switch off to separate the output powers.

14. The apparatus of claim 11, wherein the first braking control module includes:
an EPB signal input module configured to receive the EPB switch signal;
a first communication module configured to communicate with a peripheral control device through in-vehicle communication and configured to receive the braking control signal;
an EPB driving module configured to operate a parking brake;
an additional braking valve driving module configured to drive the additional braking valve for additional braking;
a first cylinder pressure input module configured to receive the cylinder pressure value from a cylinder pressure sensor; and
a first processor operatively coupled to the EPB signal input module, the first communication module, the EPB driving module, the additional braking valve driving module, and the first cylinder pressure input module,
wherein the first processor controls the EPB driving module and the additional braking valve driving module according to signals input from at least one of the EPB signal input module, the first communication module, or the first cylinder pressure input module.

15. The apparatus of claim 14, wherein the first communication module includes a common channel shared with the second braking control module.

16. The apparatus of claim 14, wherein:
when a failure signal received by the first processor corresponds to an open-circuit failure that occurs in the second power module, the first processor turns the integrated switch on, and
when the failure signal corresponds to a short-circuit failure that occurs in the second power module, the first processor turns the integrated switch off.

17. The apparatus of claim 11, wherein the second braking control module includes:
a pedal signal input module configured to receive a pedal stroke value from a brake pedal sensor;
a second communication module configured to communicate with a peripheral control device through in-vehicle communication and configured to receive the braking control signal;
a motor driving module configured to drive the braking motor;
a main braking valve driving module configured to drive the main braking valve for main braking of a vehicle;

a second cylinder pressure input module configured to receive the cylinder pressure value from a cylinder pressure sensor; and a second processor operatively coupled to the pedal signal input module, the second communication module, the motor driving module, the main braking valve driving module, and the second cylinder pressure input module, wherein the second processor controls the motor driving module and the main braking valve driving module according to signals input from at least one of the pedal signal input module, the second communication module, or the second cylinder pressure input module.

18. The apparatus of claim 17, wherein the second communication module includes a common channel shared with the first braking control module.

19. The apparatus of claim 17, wherein:

when a failure signal received by the second processor corresponds to an open-circuit failure that occurs in the first power module, the second processor turns the integrated switch on, and when the failure signal corresponds to a short-circuit failure that occurs in the first power module, the second processor turns the integrated switch off.

* * * * *